United States Patent
Foote et al.

(10) Patent No.: US 7,597,328 B2
(45) Date of Patent: Oct. 6, 2009

(54) SEAL ASSEMBLY FOR RECIPROCATING SHAFT

(76) Inventors: Dean Foote, 4128 - 147 Street, Edmonton, Alberta, T6H 5V1 (CA); Clayton Delbridge, 2427 - 106 Street, Edmonton, Alberta, T6J 4N1 (CA); Scott Delbridge, 155 Highwood Crescent, Devon, Alberta, T9G 1W6 (CA)

(*) Notice: Subject to any disclaimer, the term of this patent is extended or adjusted under 35 U.S.C. 154(b) by 0 days.

(21) Appl. No.: 10/692,326

(22) Filed: Oct. 22, 2003

(65) Prior Publication Data
US 2004/0188949 A1 Sep. 30, 2004

(30) Foreign Application Priority Data
Oct. 22, 2002 (CA) .................................. 2409316

(51) Int. Cl.
E21B 33/10 (2006.01)
E21B 33/08 (2006.01)
F16J 15/18 (2006.01)

(52) U.S. Cl. ............ 277/336; 277/338; 277/342; 277/518

(58) Field of Classification Search ......... 277/324–325, 277/336, 338, 342, 353, 518, 908
See application file for complete search history.

(56) References Cited

U.S. PATENT DOCUMENTS

| 2,204,374 | A | | 6/1940 | Metzgar |
|---|---|---|---|---|
| 2,465,633 | A | | 3/1949 | Cartier |
| 2,536,814 | A | * | 1/1951 | Knowlton, Jr. ............ 277/518 |
| 3,310,230 | A | | 3/1967 | Wirth |
| 3,319,647 | A | * | 5/1967 | Morain ................... 137/312 |
| 3,848,877 | A | | 11/1974 | Bengtsson |
| 3,889,959 | A | * | 6/1975 | Persson ................... 277/324 |
| 3,918,478 | A | * | 11/1975 | Le Rouax ............ 137/315.02 |
| 3,987,846 | A | * | 10/1976 | Thompson ............. 166/332.1 |
| 4,093,239 | A | | 6/1978 | Sugahara |
| 4,346,611 | A | | 8/1982 | Welker |
| 4,638,972 | A | * | 1/1987 | Jones et al. ................ 251/1.3 |
| 4,877,217 | A | * | 10/1989 | Peil et al. ................... 251/1.3 |
| 5,044,602 | A | * | 9/1991 | Heinonen .................. 251/1.1 |
| 5,199,683 | A | * | 4/1993 | Le ............................... 251/1.3 |
| 5,356,157 | A | * | 10/1994 | Houston ................... 277/308 |
| 5,760,292 | A | | 6/1998 | Jostein ........................ 73/46 |

* cited by examiner

Primary Examiner—Vishal Patel
(74) Attorney, Agent, or Firm—Christensen O'Connor Johnson Kindness PLLC

(57) ABSTRACT

A seal assembly for a reciprocating shaft includes a body having a bore and a shaft adapted to move reciprocally within the body between an extended position extending from the body and a retracted position retracted within the body. The shaft has a first seal travel area which is in contact with a first seal during axial reciprocating movement of the shaft. The shaft has a second seal travel area which is in contact with a second seal during axial reciprocating movement of the shaft. The first seal travel area and the second seal travel area are axially spaced separate and distinct areas on the shaft. Damage to the exposed portion of the first seal travel area leading to a failure of the first circumferential seal, does not lead to failure of the second circumferential seal.

2 Claims, 2 Drawing Sheets

SEAL ASSEMBLY FOR RECIPROCATING SHAFT

FIELD OF THE INVENTION

The present invention relates to a seal assembly for a reciprocating shaft and, in particular, a ram shaft of a blow out preventer used to seal in an oil or gas well.

BACKGROUND OF THE INVENTION

Blow out Preventers are often closed and locked over night or for extended periods of time to shut in an oil or gas well. In the closed position, the ram shaft extends into the well bore where it is exposed to well fluids. Chemicals in the well fluids tend to deposit on the exposed portion of the ram shaft, forming an abrasive coating. This abrasive coating is rough, hard and difficult to remove. During normal operation the ram shaft is pulled back and forth past circumferential seals which seal around the ram shaft. As the abrasive coating is pulled back and forth through the seals engaging the ram shaft, the seals sustain damage leading to premature failure and a loss of containment of the well in the event of a blow out.

SUMMARY OF THE INVENTION

What is required is a seal assembly for a reciprocating shaft which will enable the Blow Out Preventer to maintain control over an oil or gas well in the event of a blow out.

According to the present invention there is provided a seal assembly for a reciprocating shaft which includes a body having a bore and a shaft adapted to move reciprocally within the body between an extended position extending from the body and a retracted position retracted within the body. A first circumferential seal cluster is positioned in the body circumscribing the shaft. The shaft has a first seal travel area that is in contact with the first circumferential seal cluster during axial reciprocating movement of the shaft. At least a portion of the first seal travel area extends from the body where it is exposed to contaminants when the shaft is in the extended position. A second circumferential seal cluster is positioned in the body circumscribing the shaft in axially spaced relation to the first circumferential seal cluster. The shaft has a second seal travel area that is in contact with the second circumferential seal cluster during axial reciprocating movement of the shaft. The second seal area remains sheltered within the body even when the shaft is in the extended position. The first seal travel area and the second seal travel area are axially spaced separate and distinct areas on the shaft. Damage to the exposed portion of the first seal travel area leading to a failure of the first circumferential seal cluster does not lead to failure of the second circumferential seal cluster. The second circumferential seal cluster engages the second seal travel area which is separate and distinct from the first seal travel area.

The seal assembly, as described above, provides a means to prevent total seal loss. A second circumferential seal cluster is positioned as a back up seal behind the first circumferential seal cluster. The second circumferential seal cluster does not engage the same portion of the shaft that is engaged by the first circumferential seal cluster. When the first circumferential seal cluster fails due to exposure to contaminants, the second circumferential seal cluster will continue to work. By spacing the second cluster from the first cluster and positioning the second seal travel area so it does not extend from the body, the second seal travel area that the second circumferential seal cluster is in contact with, is not exposed to contaminants until the first circumferential seal cluster fails.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
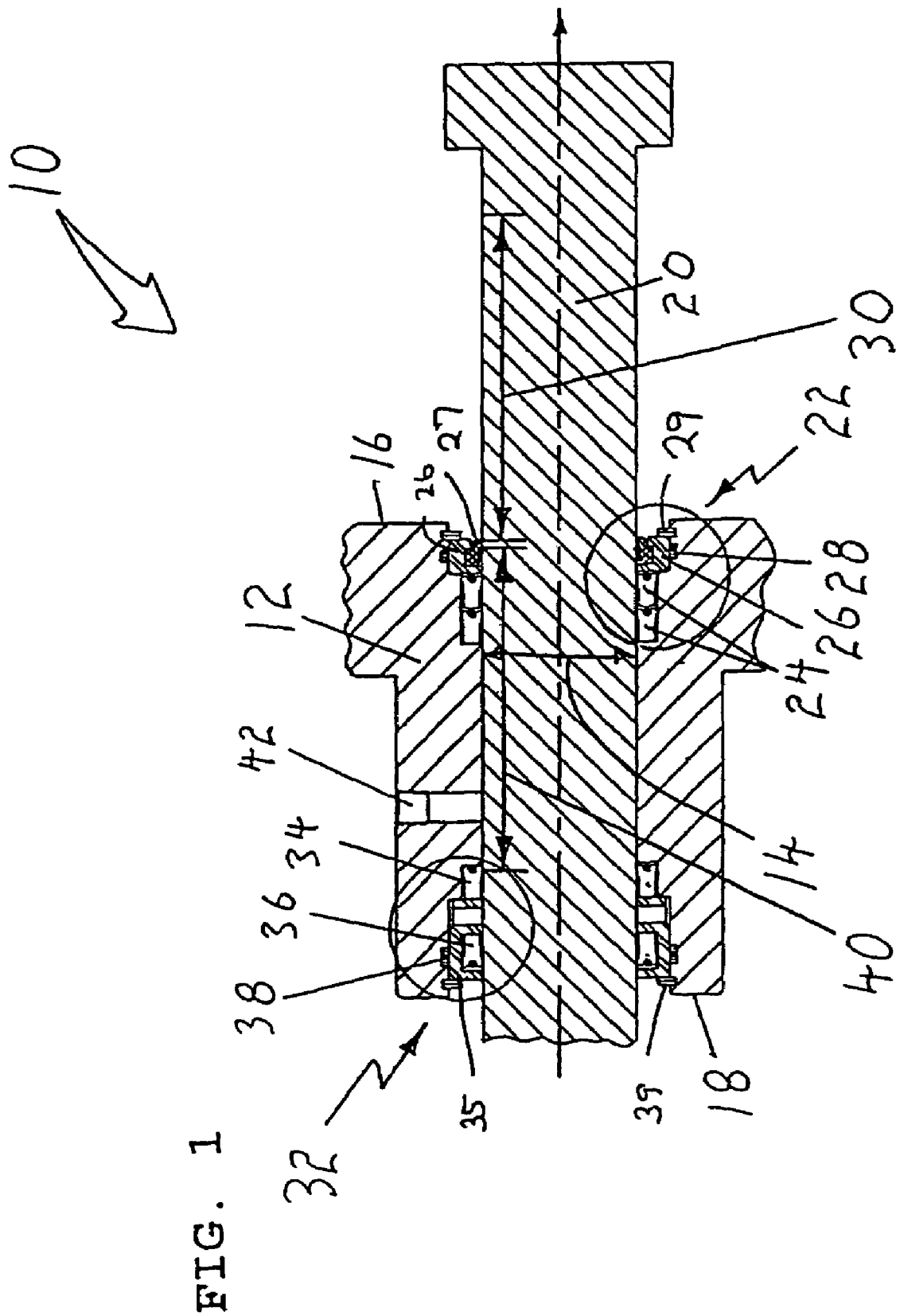
FIG. 1 is a side elevation view, in section, of a seal assembly for a reciprocating shaft constructed in accordance with the teachings of the present invention, with the shaft in an extended position.

The preferred embodiment, a seal assembly for a reciprocating shaft generally identified by reference numeral 10, will now be described with reference to FIGS. 1 and 2. Selected for the purpose of illustrating the invention is a specific application relating to sealing a ram shaft of a blow out preventer.

Structure and Relationship of Parts

Figure 2:
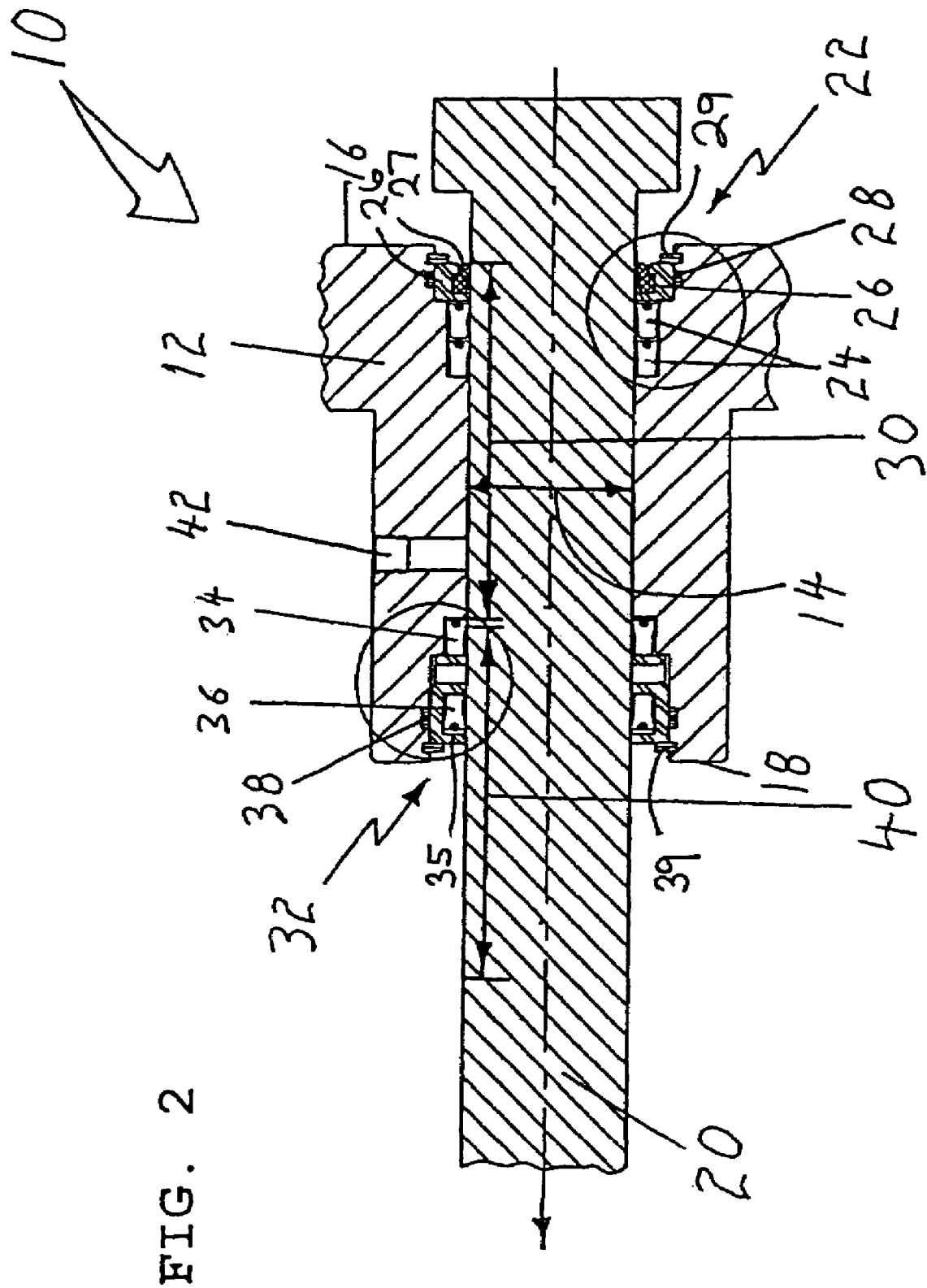
FIG. 2 is a side elevation view, in section, of the seal assembly for a reciprocating shaft illustrated in FIG. 1, with the shaft in a retracted position.

Referring to FIGS. 1 and 2, seal assembly 10 includes a body 12 having a bore 14, a first end 16 and a second end 18. A shaft 20 is adapted to move reciprocally within bore 14 of body 12. A first circumferential seal grouping 22 is provided having primary seals 24, a seal ring carrier 26 supporting a wiper seal 27, and an "O" ring seal 28 engaging seal ring carrier 26. A snap ring 29 is positioned at first end 16 of body 12, circumscribing shaft 20, to hold first circumferential seal grouping 22 in position. Shaft 20 has a first seal travel area 30 that is in contact with first circumferential seal grouping 22 during axial reciprocating movement of shaft 20. A second circumferential seal grouping 32 is provided having a backup seal 34, a seal ring carrier 35 supporting a second backup seal 36, and an "O" ring seal 38 engaging seal ring carrier 35. A snap ring 39 is positioned at second end 18 of body 12, circumscribing shaft 20 to hold second circumferential seal grouping 32 in position. Second circumferential seal grouping 32 is in axially spaced relation to first circumferential seal grouping 22. Shaft 20 has a second seal travel area 40 that is in contact with second circumferential seal grouping 32 during axial reciprocating movement of shaft 20. A port 42 is provided for lubricating shaft 20. First seal travel area 30 and second seal travel area 40 are axially spaced at separate and distinct positions on shaft 20.

Operation

The use and operation of seal assembly 10, will now be described with reference to FIGS. 1 and 2. Referring to FIG. 1, when shaft 20 is in extended position, first seal travel area 30 is exposed to contaminants. However, second seal travel area 40 is protected behind first circumferential seal grouping 22 and is not exposed. Referring to FIG. 2, shaft 20 is shown in a retracted position. Upon retraction, any contaminants adhering to first seal travel area 30 may cause damage to first circumferential seal grouping 22, compromising its effectiveness. However, second circumferential seal grouping 32 is not compromised as it has only been in contact with second seal travel area 40. With the seal assembly, as shown and described, damage to the exposed portion of first seal travel area 30 leading to a failure of first circumferential seal grouping 22 does not lead to failure of second circumferential seal grouping 32. Unlike the prior art, second circumferential seal grouping 32 contacts second seal travel area 40 which is always separate and distinct from first seal travel area 30.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A seal assembly for a reciprocating ram shaft of a blowout preventer, comprising:
   a blowout preventer body having a bore;
   a shaft having a first end and a second end, the ram shaft being adapted to move reciprocally within the blowout preventer body between a fully extended position extending from the blowout preventer body and a fully retracted position retracted within the blowout preventer body;
   at least one first circumferential seal positioned in the blowout preventer body and circumscribing the first end of the ram shaft, the first circumferential seal performing a dedicated sealing function of preventing fluids from migrating along the ram shaft from a first region of the blowout preventer body, the ram shaft having a first seal travel area which is in continuous sealing contact with the first seal during axial reciprocating movement of the ram shaft between the fully extended position and the fully retracted position, at least a portion of the first seal travel area extending from the blowout preventer body where it is exposed to contaminants when the ram shaft is in the fully extended position;
   at least one second circumferential seal positioned in the blowout preventer body and circumscribing the first end of the ram shaft in axially spaced relation to the first circumferential seal, the second circumferential seal being isolated on each side from fluids to be sealed against such that the second circumferential seal only serves an active sealing function upon failure of the first circumferential seal, the second circumferential seal being positioned to contain all fluids within the blowout preventer body and prevent fluids from migrating along the ram shaft from the first region of the blowout preventer body and to maintain the seal at the first end of the ram shaft in the event of a failure of the first circumferential seal, the ram shaft having a second seal travel area which is in continuous contact with the second seal during axial reciprocating movement of the ram shaft between the fully extended position and the fully retracted position, the second seal area remaining sheltered within the blowout preventer body even when the ram shaft is in the fully extended position; and
   the first seal travel area and the second seal travel area being axially spaced separate and distinct areas on the ram shaft, such that damage to the exposed portion of the first seal travel area leading to a failure of the at least one first circumferential seal does not lead to failure of the at least one second circumferential seal, as the second circumferential seal engages the second seal travel area which is separate and distinct from the first seal travel area.

2. The seal assembly of claim 1, wherein the first and second seals each comprise a seal cluster including a primary seal, a seal ring carrier, a wiper seal and an o-ring seal.

* * * * *